(12) United States Patent
Cho et al.

(10) Patent No.: US 7,944,782 B2
(45) Date of Patent: May 17, 2011

(54) 90°-BENT METALLIC WAVEGUIDE HAVING TAPERED C-SHAPED APERTURE, METHOD OF FABRICATING THE WAVEGUIDE, LIGHT DELIVERY MODULE INCLUDING THE WAVEGUIDE, AND HEAT ASSISTED MAGNETIC RECORDING HEAD HAVING THE WAVEGUIDE

(75) Inventors: Eun-hyoung Cho, Seoul (KR);
Sung-hoon Choa, Seoul (KR);
Jin-seung Sohn, Seoul (KR);
Sung-dong Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 698 days.

(21) Appl. No.: 11/923,976

(22) Filed: Oct. 25, 2007

(65) Prior Publication Data
US 2008/0232225 A1  Sep. 25, 2008

(30) Foreign Application Priority Data

Mar. 19, 2007  (KR) .................. 10-2007-0026790

(51) Int. Cl.
*G11B 7/00* (2006.01)
*G02B 6/10* (2006.01)

(52) U.S. Cl. ................ 369/44.11; 369/126; 360/125.31; 385/129

(58) Field of Classification Search ........................ None
See application file for complete search history.

(56) References Cited

U.S. PATENT DOCUMENTS 7,027,700 B2 * 4/2006 Challener .................. 385/129
7,599,277 B1 * 10/2009 Kato et al. ............... 369/112.27

* cited by examiner

*Primary Examiner* — Muhammad N. Edun
(74) *Attorney, Agent, or Firm* — Sughrue Mion, PLLC

(57) ABSTRACT

A metallic wave guide and a light delivery module are provided. The metallic waveguide includes a metal body formed of a conductive metal and having an aperture formed therethrough, the aperture having input and output ends. The aperture has a bent portion for changing a light traveling direction between the input and output ends, and a tapered portion between the bent portion and the output end. The tapered portion has a width that is gradually reduced toward the output end, and the aperture is formed in a C-shape by a ridge formed on an inner surface of the metal body.

25 Claims, 18 Drawing Sheets
(3 of 18 Drawing Sheet(s) Filed in Color)

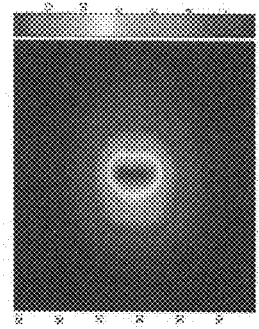
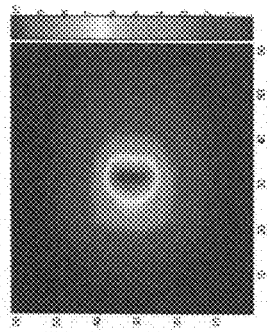
Fig. 17B
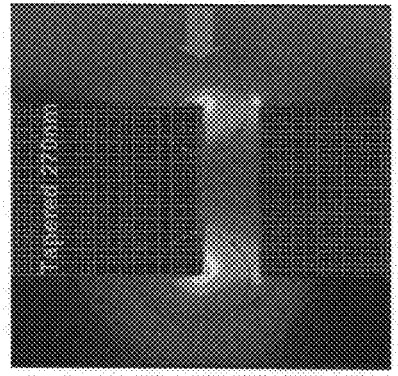
Fig. 18B
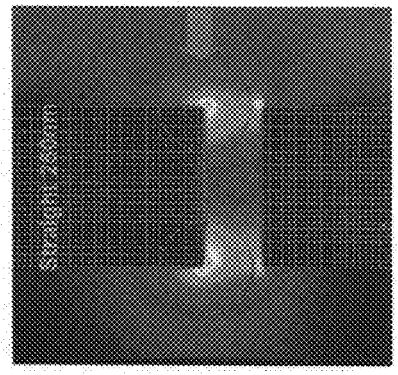
Fig. 17A
Fig. 18A

90°-BENT METALLIC WAVEGUIDE HAVING TAPERED C-SHAPED APERTURE, METHOD OF FABRICATING THE WAVEGUIDE, LIGHT DELIVERY MODULE INCLUDING THE WAVEGUIDE, AND HEAT ASSISTED MAGNETIC RECORDING HEAD HAVING THE WAVEGUIDE

CROSS-REFERENCE TO RELATED PATENT APPLICATION

This application claims priority from Korean Patent Application No. 10-2007-0026790, filed on Mar. 19, 2007, in the Korean Intellectual Property Office, the disclosure of which is incorporated herein in its entirety by reference.

BACKGROUND OF THE INVENTION

1. Field of the Invention

Apparatuses and methods consistent with the present invention relates to a bent-shaped metallic waveguide having a tapered C-shaped aperture, and more particularly, to a bent-shaped metallic waveguide that can be manufactured in an integrated structure and realize a reinforced near field effect, a method of fabricating the waveguide, a light delivery module including the waveguide, and a heat assisted magnetic recording head having the waveguide.

2. Description of the Related Art

In the field of a magnetic recording head, much research has been conducted on high-density magnetic recording. A recording density of 100 Gbit/in$^2$ has been achieved in horizontal magnetic recording, and a recording density of 100 Gbit/in$^2$ or more may be possible in vertical magnetic recording. However, the magnetic recording technology still has a limitation in providing high recording density because of thermal instability which occurs during recording due to a super paramagnetic effect.

The thermal stability in a recoding medium is determined by the ratio of magnetic anisotropy energy to thermal energy. To increase the magnetic anisotropy energy, a magnetic recording medium must be formed of a material with a strong coercive force. When the magnetic recording medium is formed of a material with a strong coercive force, a correspondingly strong magnetic field is required for recording. However, since a small-sized recording head is used to increase the recording density, the magnetic field of a main pole is saturated at a predetermined level. Therefore, recording is impossible due to a limited strength of a generated magnetic field.

To solve this problem, a heat-assisted magnetic recording (HAMR) method has been developed. In the HAMR method, the coercive force of the corresponding position is temporarily decreased by heating a local portion of the recoding medium above the Curie temperature. When compared to a related art magnetic recording method, the HAMR method can further reduce the strength of a magnetic field required for recording. At this point, since data is recorded in a region heated above the Curie temperature, the recording density is determined by the width of the heated portion rather than the size of a pole generating a magnetic field. For example, when a heating unit is a laser diode, a data recording density is determined by the spot size of a laser light emitted from the laser diode.

Accordingly, the HAMR head requires a light delivery module for emitting laser light to the recording medium. The light delivery module delivers the light to a location near the main pole. In addition, the light delivery module provides a high light intensity while reducing a spot size of light focused on the recording medium. Such a light delivery module includes a light source, a waveguide, and a small aperture, and is integrated in a small space near the main pole. However, in order to significantly change a structure of a related art magnetic head, the location where the light delivery module can be disposed is limited. For example, a waveguide for delivering light from a light source to a small aperture must be vertically disposed on a main pole. In this case, a direction of the waveguide is different from a direction of the small aperture disposed near an end of the main pole by 90°. Therefore, an optical element for changing the light direction by 90° must be disposed between the waveguide and the small aperture. A mirror may be used as the optical element. However, it is technologically difficult to integrate the optical element having a bulky structure on the related art magnetic head with a very thin thickness.

Furthermore, it is desirable that the optical delivery module be fabricated through a batch process that is identical to a process for fabricating the related art magnetic head process. To realize this, a waveguide and a small aperture that can be fabricated through a planar process at a lower temperature equal to or less than 175° C. are necessary.

Meanwhile, the small aperture delivers the light transmitted through the waveguide to a recording layer of the recording medium. At this point, in order to realize a high recording density, the light delivered to the recording layer must have a small spot size and high intensity in order to heat the recording layer up to about the Curie temperature. Generally, the spot size is determined by a size of the small aperture. It can be expected that the smaller the size of the aperture, the higher the recording density. However, when the aperture is significantly smaller than a wavelength of incident light, power throughput of the aperture is significantly reduced. For example, when a circular aperture has a radius r that is equal to or less than 1% of a wavelength of incident light, the power throughput of the aperture is reduced by a rate of $r^4$. That is, when the aperture is small-sized, high spatial resolution can be realized but the power throughput is too small. Therefore, there is a limitation in applying the small-sized aperture to a HAMR head.

Accordingly, in order to solve the low transmission problem, research on a near field optical probe continue and probes having a variety of small apertures have been proposed. However, a near field probe that has both high transmission and high resolution, and reliability and reproducibility that are appropriate for a HAMR head has not been yet developed.

SUMMARY OF THE INVENTION

The present invention provides a metallic waveguide that has an aperture through which light having high intensity and a small spot size can be output, and that can change a light traveling direction by 90° without using a separate optical element. The present invention also provides a method of fabricating the waveguide. The present invention also provides a light delivery module including the waveguide, and a heat assisted magnetic recording head having the waveguide.

According to an aspect of the present invention, there is provided a metallic waveguide comprising: a metal body formed of conductive metal; wherein an aperture having input ends and output ends is formed through the metal body, the aperture has a bent portion for changing a light traveling direction between the input and output ends, the aperture further has a tapered portion between the bent portion and the output end, the tapered portion has a width that is gradually reduced toward the output end, and the aperture is formed in a C-shape by a ridge formed on an inner surface of the metal body.

When a thickness of the metallic waveguide is defined in a direction where the light travels, a thickness $t_{out}$ of the metallic waveguide from the bent portion of the aperture to the tapered portion of the aperture may be greater than a thickness $t_{in}$ of the metallic waveguide from the input end to a before-bent portion.

The thickness $t_{in}$ of the metallic waveguide from the input end to the before-bent portion may be determined such that a frequency of an incident beam coincides with a thickness resonance frequency through a thickness resonance analysis with respect to a portion of the metallic waveguide from the input end to the before-bent portion.

The thickness $t_{in}$ of the metallic waveguide from the input end to the before-bent portion may satisfy the following equation:

$$t_{in} = 0.25\lambda \pm \Delta t_{res,\alpha}$$

where $\lambda$ is a wavelength of light and $\Delta t_{res,\alpha}$ is a thickness deviation related to front scattering and resonance.

A thickness $t_{tp}$ of the metallic waveguide at the tapered portion may be determined such that the frequency of the incident beam coincides with the thickness resonance frequency through a thickness resonance analysis with respect to the tapered portion of the metallic waveguide.

The thickness $t_{tp}$ of the metallic waveguide at the tapered portion may satisfy the following equation:

$$t_{tp} = 0.25\lambda \pm \Delta t_{res,\gamma}$$

where, $\lambda$ is a wavelength of light and $\Delta t_{res,\gamma}$ is a thickness deviation related to rear scattering and resonance.

The thickness $t_{out}$ of the metallic waveguide from the bent portion of the aperture to the tapered portion of the aperture may be determined such that the frequency of the incident beam coincides with the thickness resonance frequency through a thickness resonance analysis with respect to the overall metallic waveguide in a state where the thickness $t_{in}$ of the metallic waveguide from the input end to the before-bent portion and the thickness $t_{tp}$ of the metallic waveguide at the tapered portion are fixed.

The thickness $t_{out}$ of the metallic waveguide from the bent portion of the aperture to the tapered portion of the aperture may satisfy the following equation:

$$t_{out} = 0.5\lambda \pm \Delta t_{res,\beta}$$

where, $\lambda$ is a wavelength of light and $t_{res,\beta}$ is a thickness deviation related to scattering at the bent portion of the aperture and resonance.

Each of the metal body and the aperture formed through the metal body may have a width and a height that is less than the width.

The aperture may be filled with air or a dielectric.

A width and height of the ridge may be uniformly maintained.

According to another aspect of the present invention, there is provided a method of fabricating the metallic waveguide, the method including: forming a metal layer on a substrate; forming the bent ridge having a predetermined width and thickness by etching a portion of the metallic layer; depositing an ultraviolet (UV)-curable resin on the ridge and the rest of the metal layer; forming the bent aperture bent surrounding the ridge and having the tapered structure whose width is gradually reduced at an end by partly hardening the UV-curable resin; removing an unhardened portion of the UV-curable resin; and forming a metal layer surrounding the aperture.

According to another aspect of the present invention, there is provided a light delivery module including: a first metallic waveguide formed of a conductive metal and provided with an aperture therein; and a second waveguide for delivering light from a light source to the first metallic waveguide, wherein, in the first metallic waveguide, wherein the aperture has a bent portion for changing a light traveling direction between the input and output ends, the aperture further has a tapered portion between the bent portion and the output end, the tapered portion has a width that is gradually reduced toward the output end, and the aperture is formed in a C-shape by a ridge formed on an inner surface of the first metallic waveguide.

The second waveguide may be designed in a flat shape where a width is greater than a height and a width of the input end is greater than a width of the output end.

Each of the first metallic waveguide and the aperture may have a width and a height that are less than the width to realize a profile matching with the second waveguide.

The second waveguide may be a polymer waveguide.

According to another aspect of the present invention, there is provided a heat assisted magnetic recording head including: a magnetic recording unit forming a magnetic field for recording information on a magnetic recording medium; a light delivery module emitting light to heat a recording region of the magnetic recording medium, wherein the light delivery module comprises a first metallic waveguide formed of conductive metal and provided with an aperture therein and a second waveguide for delivering light from a light source to the first metallic waveguide, wherein, in the first metallic waveguide, wherein the aperture has a bent portion for changing a light traveling direction between the input and output ends, the aperture further has a tapered portion between the bent portion and the output end, the tapered portion has a width that is gradually reduced toward the output end, and the aperture is formed in a C-shape by a ridge formed on an inner surface of first metallic waveguide.

The magnetic recording unit may include: a main pole forming a magnetic field magnetizing the magnetic recording medium; a return pole disposed facing a surface of the main pole and magnetically connected to the main pole to form a magnetic path; an inductive coil for inducing the magnetic field to the main pole; a sub-yoke disposed on the other surface of the main pole to assist the focusing of magnetic flux on an extreme end of the main pole.

The light delivery module may be disposed at a location facing the other surface of the main pole at a side surface of the sub-yoke.

The output end of the first metallic waveguide may be oriented in a direction identical to a direction in which the extreme end of the main pole is oriented.

BRIEF DESCRIPTION OF THE DRAWINGS

The patent or application file contains at least one drawing executed in color. Copies of this patent or patent application publication with color drawings will be provided by the Office upon request and payment of the necessary fee.

The above and other aspects of the present invention will become more apparent by describing in detail exemplary embodiments thereof with reference to the attached drawings in which:

FIG. 17A through 17C are views respectively illustrating a field distribution, a spot shape of output light, and field intensity in a C-shaped aperture having a uniform wide width of 360 nm, according to an exemplary embodiment of the present invention;

FIG. 18A through 18C are views respectively illustrating a field distribution, a spot shape of output light, and field intensity in a tapered C-shaped aperture whose width is reduced to 270 nm, according to an exemplary embodiment of the present invention;

DETAILED DESCRIPTION OF EXEMPLARY EMBODIMENTS

Figure 1:
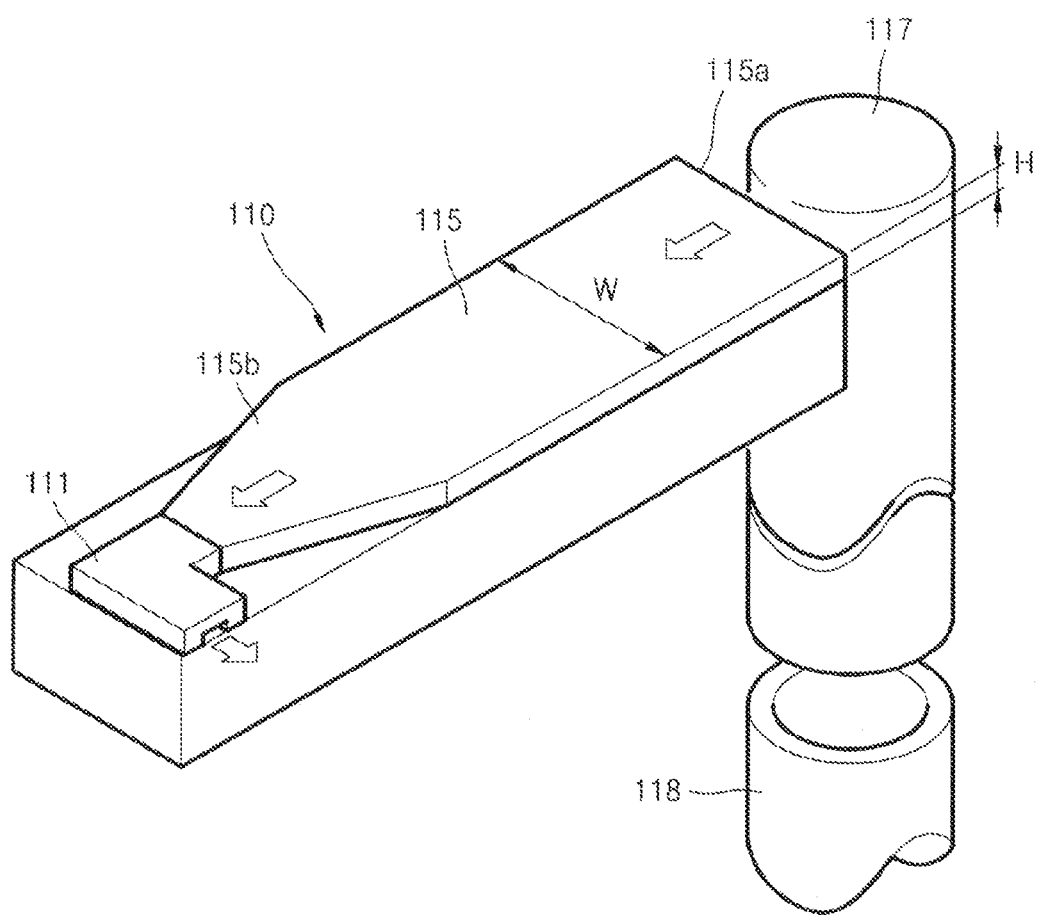
FIG. 1 is a schematic perspective view of a light delivery module according to an exemplary embodiment of the present invention.

Reference will now be made in detail to exemplary embodiments of the present invention, examples of which are illustrated in the accompanying drawings. The invention may, however, be embodied in many different forms and should not be construed as being limited to the embodiments set forth herein; rather, these exemplary embodiments are provided so that this disclosure will be thorough and complete, and will fully convey the concept of the invention to those skilled in the art. Like reference numerals refer to like elements throughout the drawings.

FIG. 1 is a schematic perspective view of a light delivery module 110 according to an exemplary embodiment of the present invention. Referring to FIG. 1, the light delivery module 110 includes a tapered polymer waveguide 115 disposed on a mount 140 and a 90°-bent metallic waveguide 111 coupled to the polymer waveguide 115. An input end 115a of the polymer waveguide 115 may be coupled to an optical fiber 117 through, for example, a direct end coupling method or a butt-coupling method. An output end 115b of the polymer waveguide 115 is coupled to the metallic waveguide 111. Therefore, light transmitted from a light source 118 to the input end 115a of the polymer waveguide 115 through the optical fiber 117 is further transmitted to the metallic waveguide 111 through the output end 115b of the polymer waveguide 115.

When a laser diode is used as the light source 118, in order to maximize the coupling efficiency between the light source 118 and the polymer waveguide 115, a distance between the light source 118 and the polymer waveguide 115 must be minimized, and profile matching between an active layer of the laser diode and a guiding layer of the polymer waveguide 115 must be realized. When the laser diode is configured to perform an ideal single mode oscillation, light emitted from the laser diode is linearly polarized and becomes parallel with an abutting surface. However, since there is a polarization component that is vertical to the abutting surface, a polarization ratio between the parallel polarization component and the vertical polarization component in the light emitted from the laser diode becomes about 100. Therefore, in order to realize the profile matching with the active layer of the laser diode, as shown in FIG. 1, the polymer waveguide 115 of an exemplary embodiment of the present invention may be configured to have a flat shape where a width W is greater than a height H.

Further, in order to minimize a coupling loss with the light source (118) side, the polymer waveguide 115 may be configured to have a tapered structure where a width of the input end 115a is greater than a width of the output end 115b as shown in FIG. 1.

Figure 2:
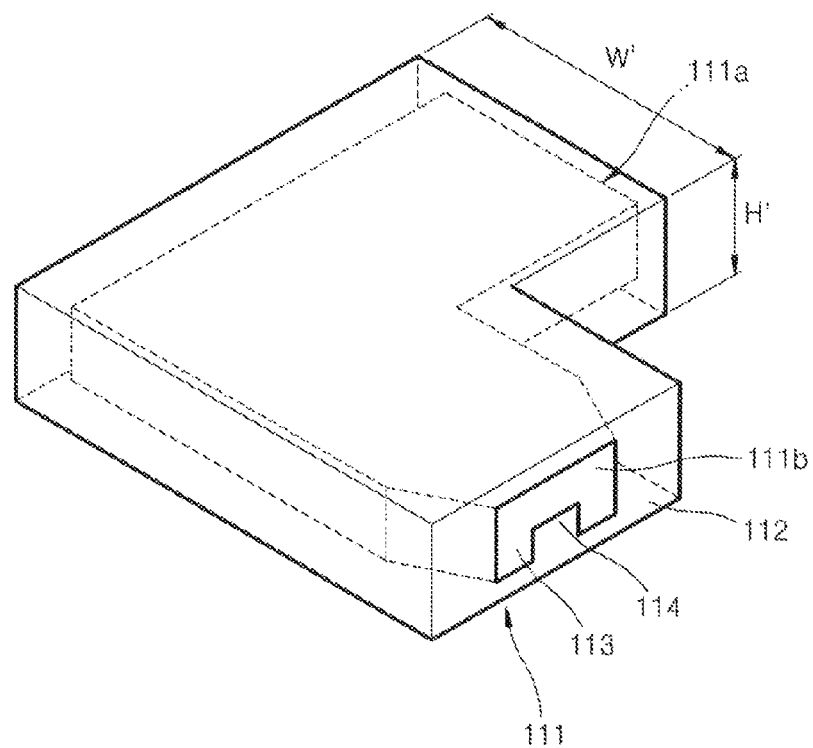
FIG. 2 is a schematic perspective view of a 90°-bent metallic waveguide having a tapered C-shaped aperture according to an exemplary embodiment of the present invention.
Figure 3:
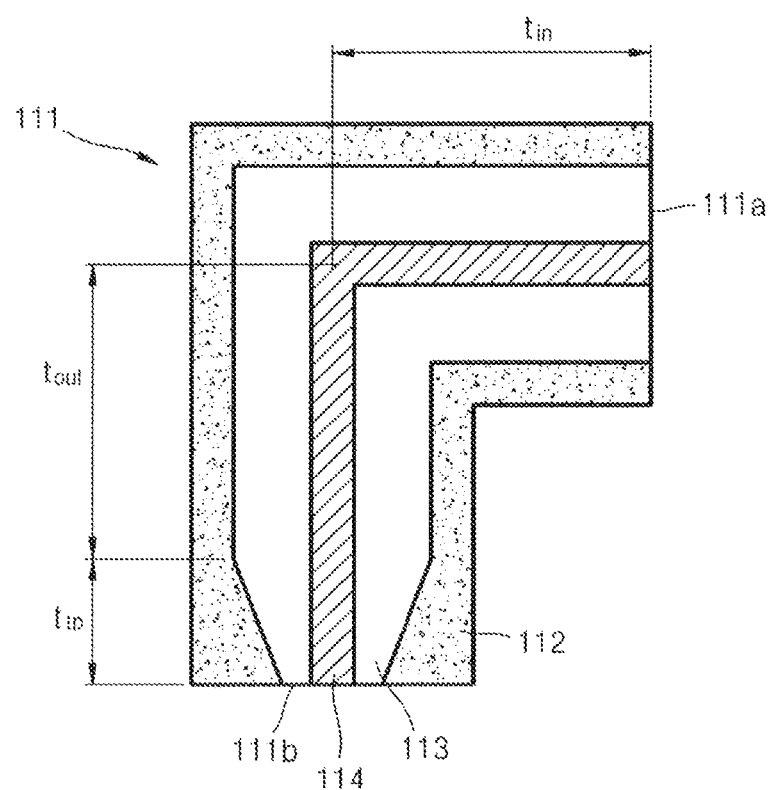
FIG. 3 is a sectional view of a 90°-bent metallic waveguide having a tapered C-shaped aperture according to an exemplary embodiment of the present invention.

A structure of the 90°-bent metallic waveguide will be described with reference to the accompanying drawings. Referring to FIGS. 2 and 3, the metallic waveguide 111 includes a metal body 112 provided with an aperture 113. The metal body 112 may be formed of gold (Au), which has excellent conductivity. The aperture 113 may be filled with air or a dielectric. For example, the aperture 113 may be filled with a resin.

According to an exemplary embodiment of the present invention, as shown in FIGS. 2 and 3, a direction of the aperture 113 at the input end 111a may be perpendicular to a direction of the aperture 113 at the output end 111b. At this point, in order to change a light traveling direction by 90° without using an optical element such as a mirror, the aperture 113 is designed to have a C-shaped section. To achieve this, a ridge 114 having a predetermined width and a predetermined height is formed on an inner surface of the metal body 112.

In order to minimize a coupling loss between the metallic waveguide 111 and the polymer waveguide 115, a profile matching must be realized between the input end 111a of the metallic waveguide 111 and the output end 115b of the polymer waveguide 115. To this end, like the polymer waveguide 115, the metallic waveguide 111 is configured to have a flat structure where a width W' is greater than a height H'. In order to obtain a small-sized light spot at the output end 111b, the aperture 113 may have a tapered structure where a width thereof is gradually reduced from a predetermined location of the output end 111b after it is bent by 90°.

An additional consideration in the above structure of the metallic waveguide is that, since the polymer waveguide 115 has a tapered structure to minimize the coupling loss, a thickness $t_{out}$ of an after-bent-portion of the metallic waveguide 111 from the bent portion to the taper structure must be greater than a thickness $t_{in}$ of a before-bent-portion (i.e., the input end 111a side) of the metallic waveguide 111. A thickness of the metallic waveguide is defined in a direction where the light travels.

The 90°-bent metallic waveguide 111 must be designed to satisfy a specific resonance condition proper to a field enhancement property while satisfying the above-described conditions. Generally, when light is incident on a metal plate having an aperture, a transmission resonance condition must be satisfied to allow the light to pass through the aperture. The transmission resonance results from collective surface resonant oscillation of an electric charge and current in a metallic plate, which are respectively generated at the input and output ends of the aperture. The incident light satisfying the transmission resonance condition is field-enhanced at the aperture of the metallic plate, and thus the incident light may be rear-scattered without steeply reducing transmittance. Further, when the metallic plate is thickened, oscillation of the electric charge and current is additionally generated in the aperture. Therefore, different thickness resonances exist. As a result, the overall transmission and field enhancement at the aperture of the metallic plate are determined by the interaction of the thickness resonances as well as by the surface resonance oscillation. Such a thickness resonance is realized when the light transmitting in a thickness direction along the aperture forms a standing wave. Accordingly, when the metallic plate is thicker than a predetermined thickness, the metallic plate and the light satisfy a predetermined thickness resonance condition in order to allow the light incident on the aperture of the metallic plate to effectively pass therethrough.

Therefore, there is a need to design the 90°-bent metallic waveguide 111 according to the following order. That is, in order to minimize the coupling loss with the polymer waveguide 115, an optimal resonance thickness $t_{in}$ at the input end 111a of the metallic waveguide 111 is first determined. Next, in order to reduce the light spot size and obtain a desired light spot shape, an optimal resonance thickness $t_{tp}$ at the tapered output end 111b of the metallic waveguide 111 is determined. Finally, in order to minimize the loss at the light path bending portion, an optimal resonance thickness $t_{out}$ at the before-bent portion and the after-bent portion.

Figure 4:
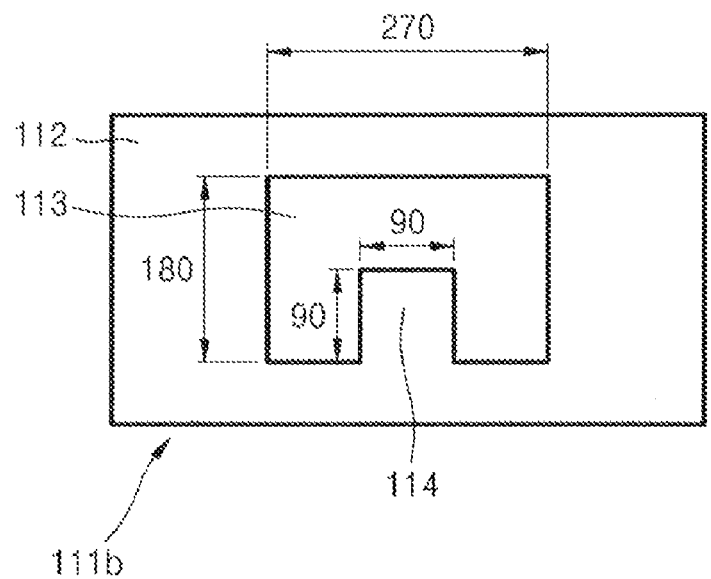
FIG. 4 is a sectional view illustrating a size at an output end of a C-shaped aperture provided on a metallic waveguide according to an exemplary embodiment of the present invention.
Figure 5:
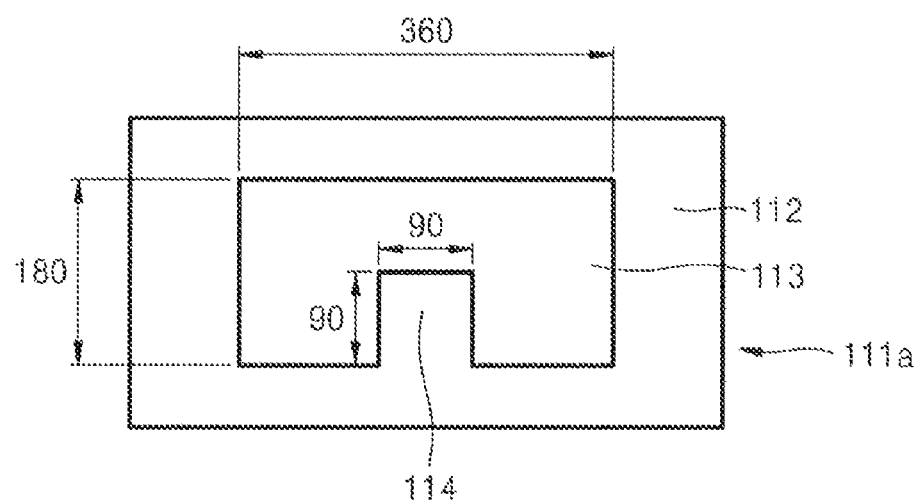
FIG. 5 is a sectional view illustrating a size at an input end of a C-shaped aperture provided on a metallic waveguide according to an exemplary embodiment of the present invention.

The following will describe a process for determining the optimal thicknesses $t_{in}$, $t_{tp}$, and $t_{out}$ at each portion of the 90°-bent metallic waveguide. Here, as shown in FIG. 4, a width and height of the aperture 113 at the output end 111b of the metallic waveguide 111 are respectively 270 nm and 180 nm. In addition, a width and height of the ridge 114 at the output end 111b are respectively 90 nm and 90 nm. As shown in FIG. 5, in order to reduce the coupling loss with the polymer waveguide 115, a width of the aperture 113 at the input end 111a of the metallic waveguide 111 increases to 360 nm. A height of the aperture 113 is maintained at 180 nm. Like at the output end, a width and height of the ridge 114 at the input end 111a are respectively 90 nm and 90 nm.

Figure 6:
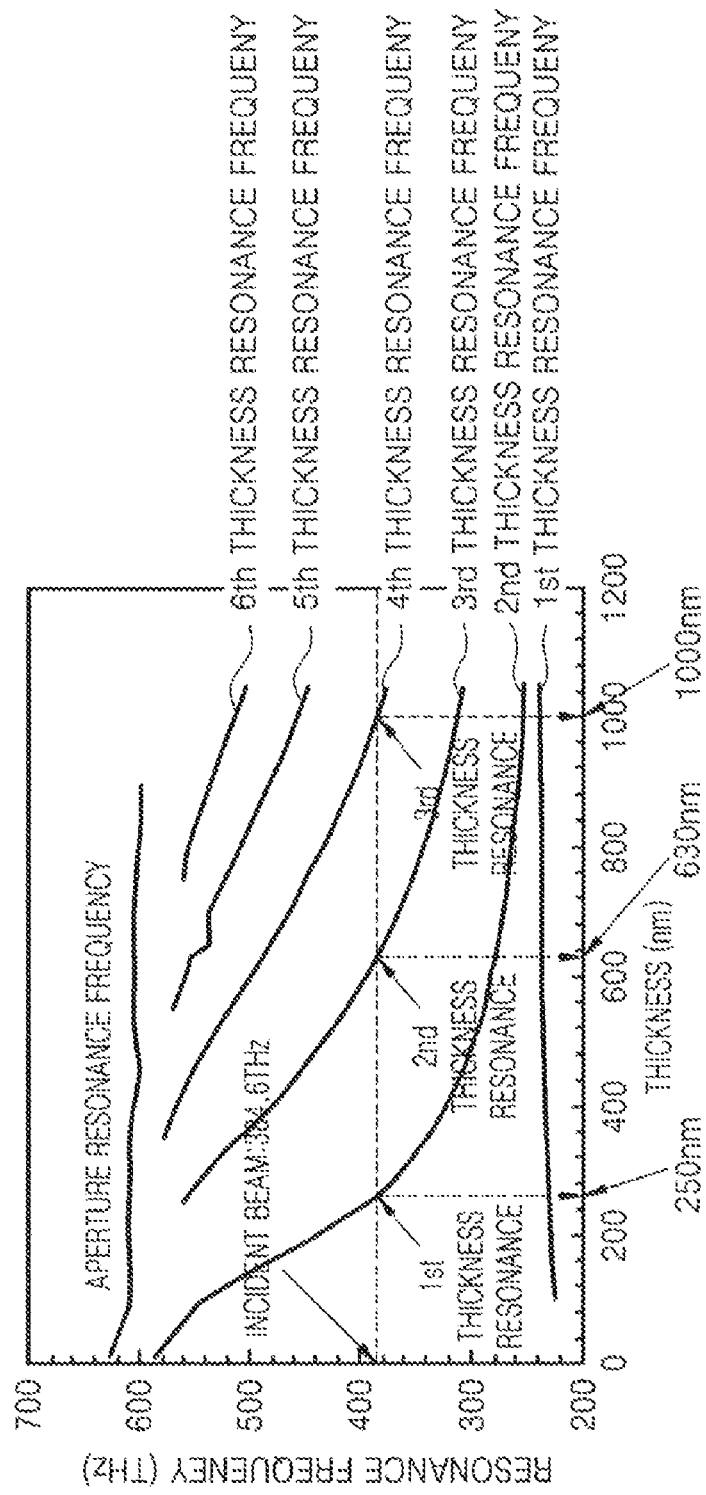
FIG. 6 is a graph of a frequency response function illustrating an aperture resonance property that varies in accordance with a thickness variation of an input end side of a metallic waveguide according to an exemplary embodiment of the present invention.

FIG. 6 shows a graph of a frequency response function (FRF) representing an aperture resonance property that varies in accordance with a thickness variation of the input end 111a of the metallic waveguide 111. As shown in FIG. 6, an aperture resonance frequency relating to a shape of the aperture 113 is almost the same even when the thickness of the input end 111a of the metallic waveguide 111 varies, but is disappeared when the thickness increases up to 950 nm. In addition, as the thickness increases, new frequencies are generated. These new frequencies are thickness resonance frequencies that significantly vary in accordance with the thickness variation.

Here, when the frequency of an incident beam coincides with the thickness resonance frequency, photons of the input end can effectively move through the waveguide having the C-shaped aperture, thereby realizing the field enhancement property. As can be noted from the graph of FIG. 6, in the waveguide 111 having the C-shaped aperture having a relative large width, when the frequency of the incident beam is for example 384.6 THz (i.e., λ=780 nm), the frequency of the incident beam coincides with the thickness resonance frequency at each thickness of 250 nm, 630 nm, and 1000 nm. Therefore, the input end 111a of the metallic waveguide 111 is designed to have one of the above thicknesses to realize the field enhancement property.

Figure 7:
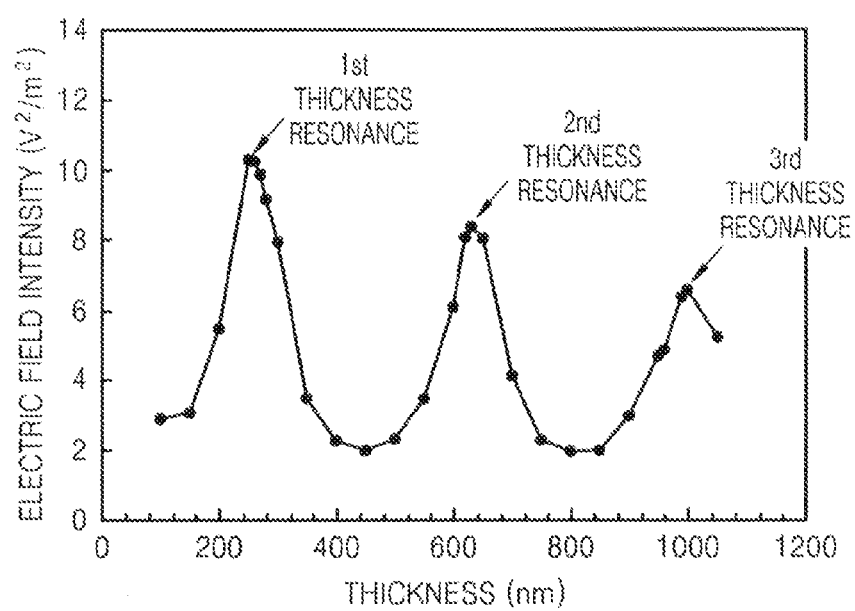
FIG. 7 is a graph illustrating light intensity that varies in accordance with a thickness variation of an input end side of a metallic waveguide according to an exemplary embodiment of the present invention.

Meanwhile, the following Table 1 shows a variation of the thickness resonance thickness in accordance with a width variation of the aperture 113. As can be noted from Table 1 and FIG. 6, as the width increases, the resonance frequency is reduced. Further, referring to FIG. 7 and Table 2, it can be noted that electric field intensity is maximized when a thickness resonance is generated. It can be further noted that, as the resonance order number increases, the electric field intensity is gradually reduced.

TABLE 1

| Width of Aperture | Resonance Thickness (nm) | | |
|---|---|---|---|
| (nm) | 1st | 2nd | 3rd |
| 270 | 300 | 720 | 1130 |
| 360 | 250 | 630 | 1000 |

TABLE 2

| Width of Aperture | Electric Field Intensity ($V^2/m^2$) | | |
|---|---|---|---|
| (nm) | 1st | 2nd | 3rd |
| 270 | 11.930 | 8.049 | 5.963 |
| 360 | 10.278 | 8.358 | 6.546 |

Figure 9:
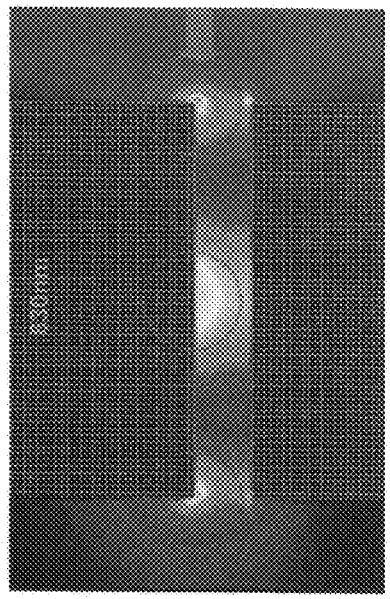
FIGS. 8 through 10 are views each illustrating a field distribution in an aperture at an input end of a metallic waveguide having first through third resonance thicknesses according to an exemplary embodiment of the present invention.
Figure 8:
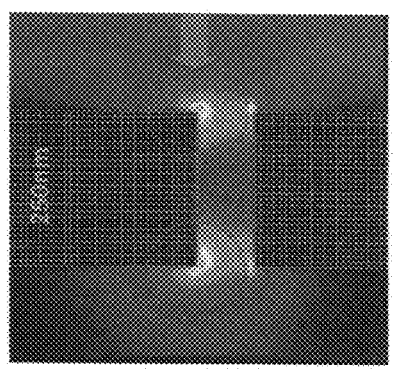
Figure 10:
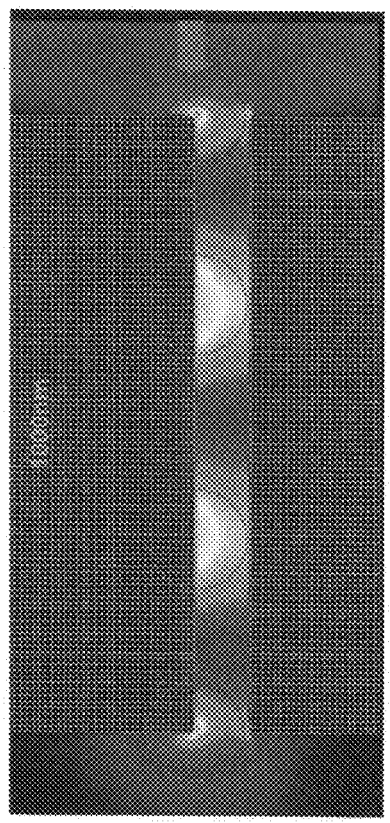
Figure 11:
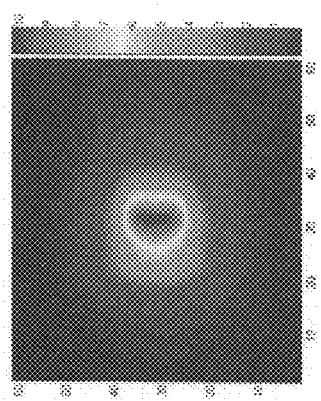
FIGS. 11 through 13 are views each illustrating a light spot shape after the light passes through an input end of a metallic waveguide at the first through third thickness resonances that are respectively illustrated in FIGS. 8 through 10.
Figure 12:
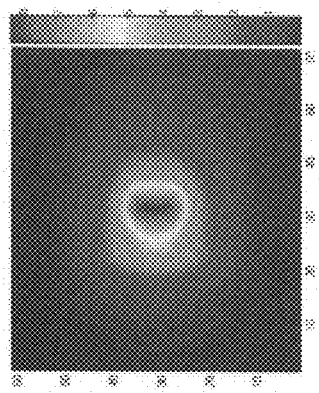
Figure 13:
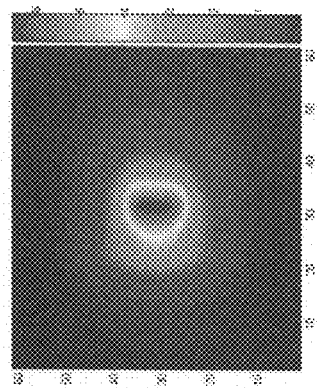

FIGS. 8 through 10 show a field distribution in the aperture at the input end 111a of the waveguide 111 having a thickness resonance. As shown in FIGS. 8 through 10, as the thickness increases, a pattern of light traveling in the aperture 113 becomes complicated. As shown in FIG. 8, at the first thickness resonance, the field is concentrated only on the input and output ends. However, as shown in FIGS. 9 and 10, at the second and third thickness resonances, the field is further concentrated on one or two other locations in the aperture 113 in addition to the input and output ends. Therefore, it can be noted that, when the thickness resonance is generated, the light traveling in the aperture 113 forms a standing wave in the aperture 113. FIGS. 11 through 13 show light spot shapes formed at a location spaced apart from the input end 111a by 40 nm after the light passes through the input end 111a of the waveguide 111 at the first through third thickness resonances shown in FIGS. 8 through 10. According to the present exemplary embodiment, the light spots are identical in size (140 nm×150 nm) and shape to each other but differ in light intensity.

Figure 14:
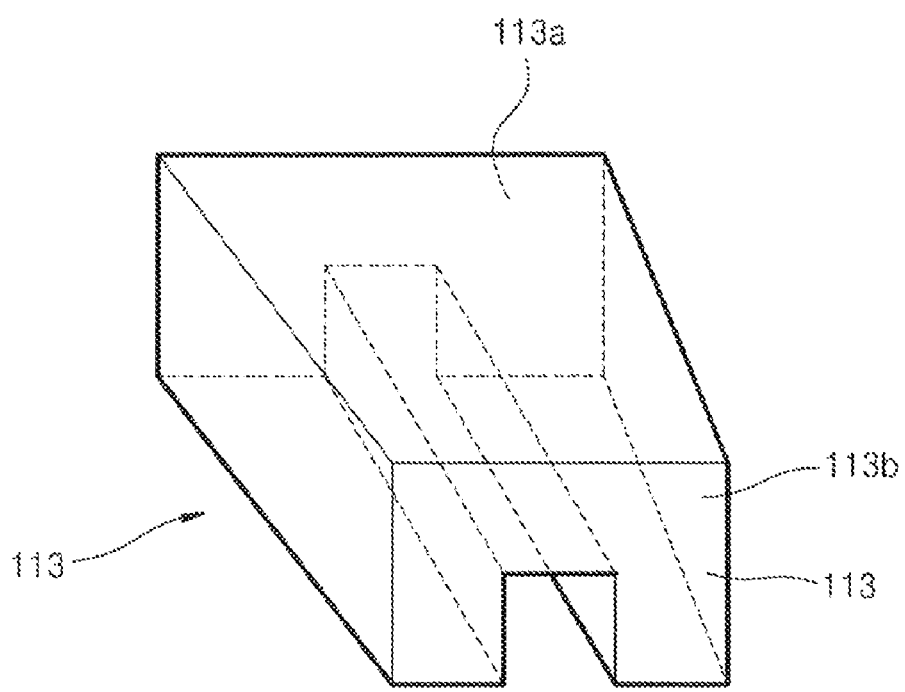
FIG. 14 is a perspective view of a tapered output end of a C-shaped aperture provided on a metallic waveguide according to an exemplary embodiment of the present invention.

A process for determining the thickness $t_{tp}$ at the tapered output end 111b of the metallic waveguide 111 is as follows. As described above, although the input end 111a requires a relatively wide aperture width for the profile matching with the polymer waveguide 115, the output end 111b requires a different type of aperture 113 in order to reduce the light spot size and provide a desired light spot shape. That is, there is a need to reduce the width of the aperture 113. Accordingly, as shown in FIG. 14, the metallic waveguide 111 in the exemplary embodiment has the tapered C-shaped aperture 113 near the output end 111b after it is bent by 90°. For example, widths of the respective input and output ends 113a and 113b of the tapered C-shaped aperture 113 shown in FIG. 14 may be respectively 360 nm and 270 nm.

Figure 15:
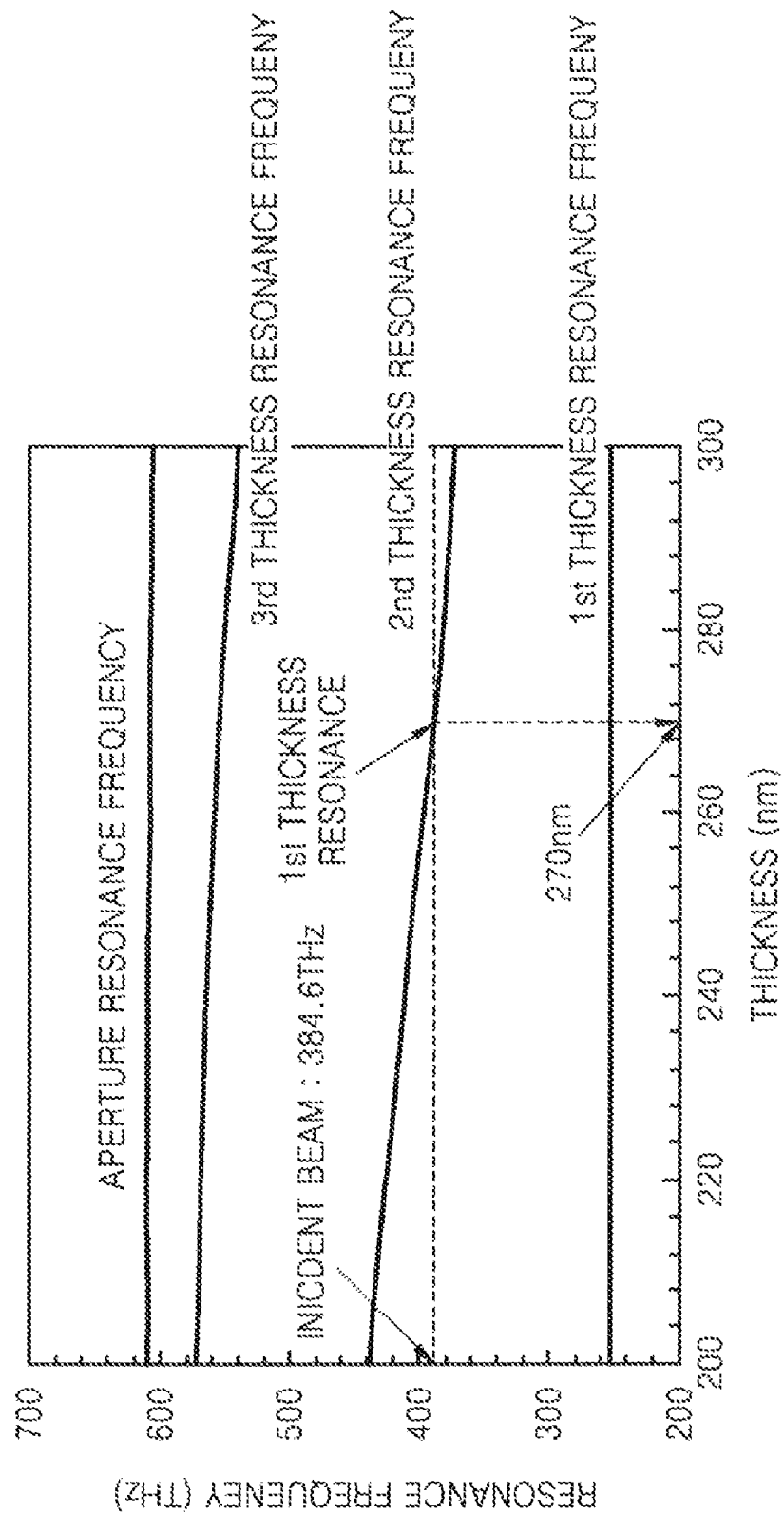
FIG. 15 is a graph of a frequency response function illustrating an aperture resonance property that varies in accordance with a thickness variation of an output end side of a metallic waveguide according to an exemplary embodiment of the present invention.

The thickness $t_{tp}$ of the tapered C-shaped aperture 113 shown in FIG. 14 is also determined considering the resonance thickness. FIG. 15 shows a variation of the resonance frequency in accordance with a thickness variation in the event that a width of the input end 113a is 360 nm, a width of the output end 113b is 270 nm, and a wavelength of the incident beam is 384.6 THz. As can be noted from FIG. 15, a first resonance thickness is about 270 nm. Therefore, when the 90°-bent metallic waveguide 111 includes the tapered C-shaped aperture 113, the tapered output end 111b is designed to have the thickness $t_{tp}$ of about 270 nm.

Figure 16:
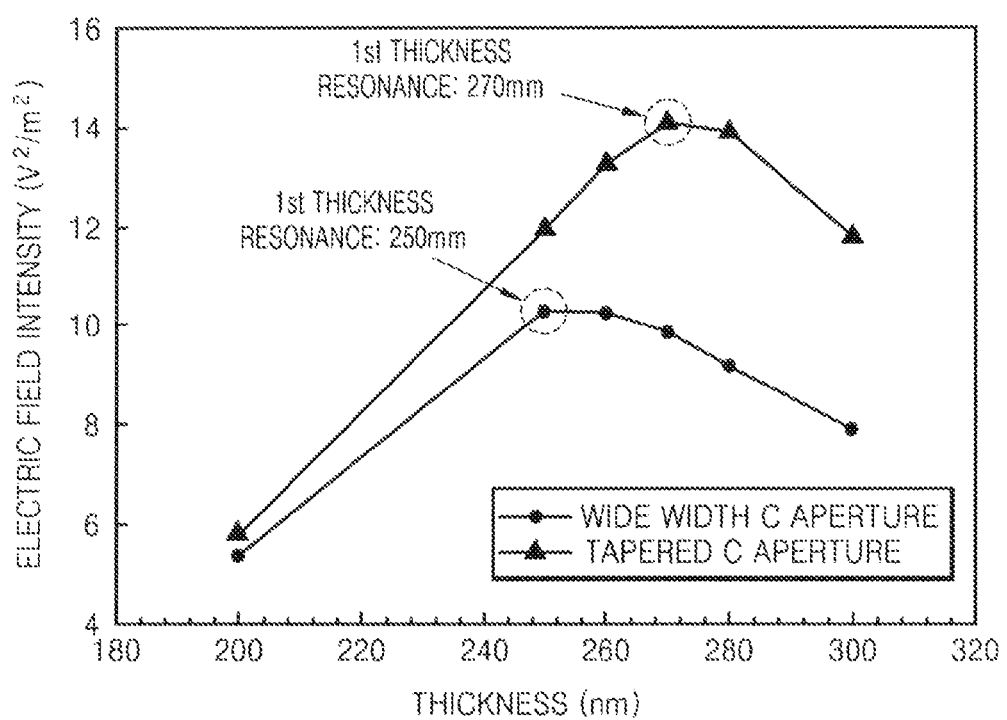
FIG. 16 is a graph illustrating electric field intensity that varies in accordance with a thickness variation of a C-shaped aperture at an output end side of a metallic waveguide according to an exemplary embodiment of the present invention.

FIG. 16 is a graph illustrating a variation of the electric field intensity according to a thickness of the C-shaped aperture. In FIG. 16, a curve represented by '-●-' relates to a C-shaped aperture having a uniform wide width of 360 nm and a curve represented by '-▲-' relates to a tapered C-shaped aperture having an output end whose width is reduced to 270 nm. As shown in FIG. 16, the electric field intensity of the tapered C-shaped aperture at the resonance thickness increases by 37% as compared with the C-shaped aperture having the uniform wide width. This is because the field is concentrated on the ridge at the output end due to reduction of a width of the tapered C-shaped aperture in a thickness direction.

Figure 17C:
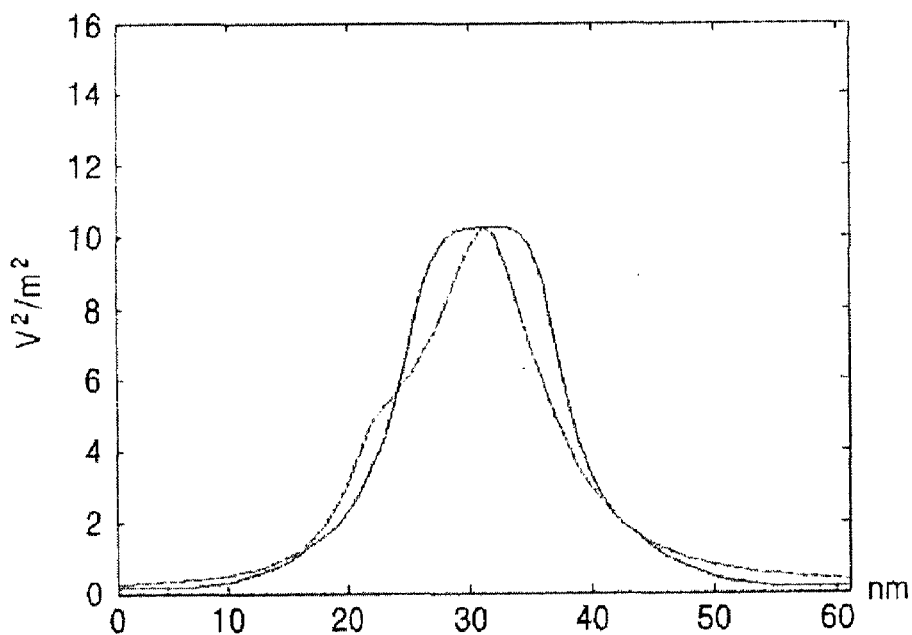
Figure 18C:
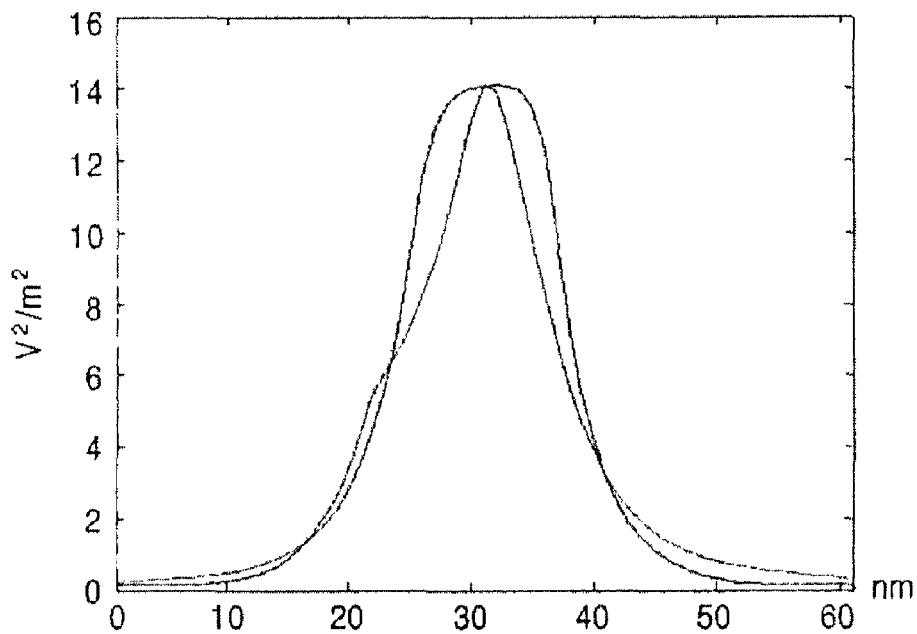

FIG. 17A through 17C are views respectively illustrating a field distribution, a spot shape of output light, and field intensity in the C-shaped aperture having a uniform wide width of 360 nm, and FIGS. 18A through 18C are views showing a field distribution, a spot shape of output light, and field intensity in the tapered C-shaped aperture having a width of 270 nm that is reduced. When comparing FIG. 17A with FIG. 18A, although a thickness of the C-shaped aperture having the uniform width is 250 nm and a thickness of the tapered C-shaped aperture is 270 nm, the field distributions in the apertures are similar to each other. When comparing FIG. 17B with FIG. 18B, the spot size of the output light of the tapered C-shaped aperture is less than that of the C-shaped aperture having the uniform width. That is, a spot length in an x-direction of the output light of the C-shaped aperture having the uniform width is 140 nm while that of the tapered C-shaped aperture is reduced to 120 nm. The output lights of both apertures are identical in a spot length in a y-direction to each other. This results from that the spot length in the y-direction is determined by the width of the ridge 114. That is, since the ridge 114 has a uniform width of 90 nm, the spot length in the y-direction for the tapered C-shaped aperture is identical to that for the C-shaped aperture having the uniform width. Accordingly, in order to adjust the spot length in the y-direction, there is a need to change the width of the ridge 114 other than the width of the aperture 113. When comparing FIG. 17C with FIG. 18C, the tapered C-shaped aperture can obtain a light spot having a relatively large intensity and a relatively small width in the x-direction.

Through the above-described processes, the thickness $t_{in}$ of the input end 111a of the 90°-bent metallic waveguide 111, and the thickness $t_{tp}$ of the tapered output end 111b of the 90°-bent metallic waveguide 111 are determined. Finally, the thickness $t_{out}$ from the bent portion to the tapered output end 111b is determined. This thickness $t_{out}$ is also determined through the thickness resonance analysis. When the thickness $t_{in}$ of the input end 111a and the thickness $t_{tp}$ of the tapered output end of the metallic waveguide 111 are determined, the thickness resonance analysis is individually performed in a state where the corresponding portions are separated from each other. However, when the thickness $t_{out}$ from the bent portion to the tapered output end 111b is determined, the thickness resonance analysis is performed for an entire portion of the metallic waveguide 111 while varying the thickness $t_{out}$ in a state where the thicknesses $t_{in}$ and $t_{tp}$ are fixed at predetermined values. For example, when light having a wavelength of 384.6 THz is used, the thickness $t_{in}$ of the input end 111a is set to be 250 nm and the thickness $t_{tp}$ of the tapered output end 111b is set to be 270 nm. In this state, the thickness resonance analysis is done for the entire portion of the metallic waveguide 111 to thereby determine the thickness $t_{out}$ from the bent portion to the tapered portion.

Figure 19:
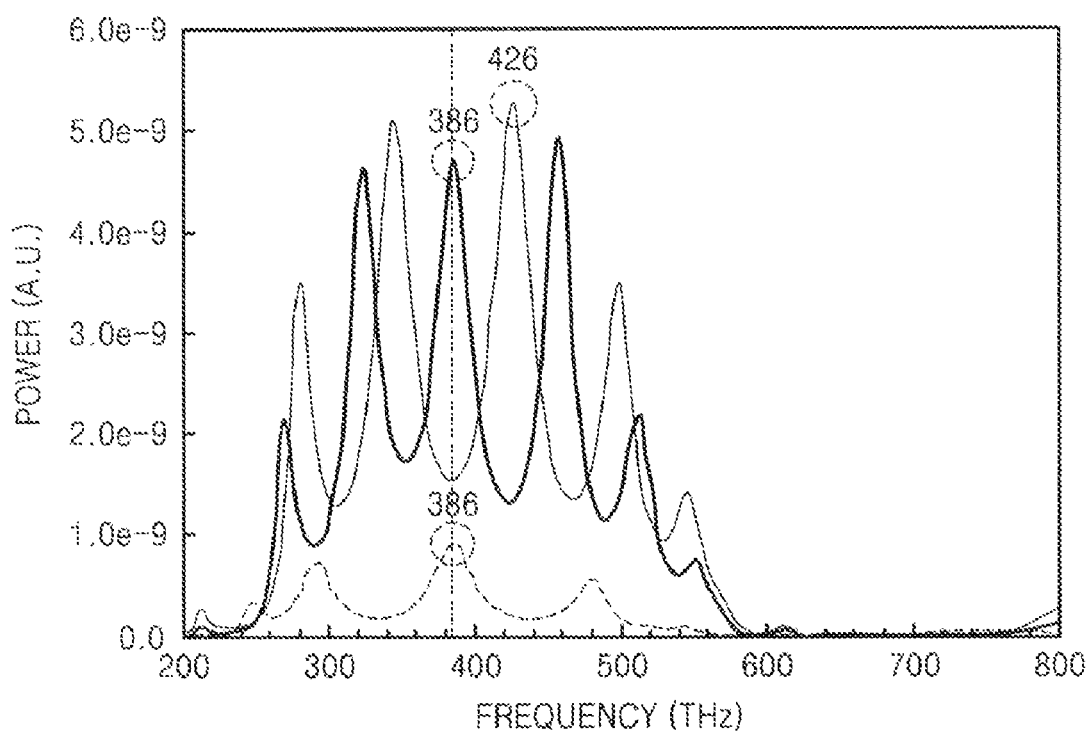
FIG. 19 is a graph illustrating a result when a thickness resonance analysis is finally performed, according to an exemplary embodiment of the present invention.

FIG. 19 is a graph illustrating a result when a thickness resonance analysis is finally performed as described above. In FIG. 19, a thick solid line shows a case where the thickness $t_{out}$ is 420 nm and a thin solid line shows a case where the thickness $t_{out}$ is 250 nm. A dotted line shows a comparative example where the metallic waveguide is not bent and has an input end thickness of 380 nm and a tapered output end thickness of 270 nm. As shown in FIG. 19, when the thickness $t_{out}$ from the bent portion to the tapered output end 111b is 420 nm, a result where the resonance frequency coincides with the frequency of the incident beam is obtained. When measuring electric field intensity at the output end of the 90°-bent metallic waveguide 111 designed as described above, it can be noted that the intensity of the output light spot has a relatively high value of about 13.0104 $V^2/m^2$. That is, the electric field intensity is not reduced even after the light passes through the 90°-bent metallic waveguide 111. Namely, it can be noted that the field enhancement property is maintained.

As described above, when designing the 90°-bent metallic waveguide 111, it can be considered that the thickness $t_{in}$ of the input end 111a before bent by 90° satisfies approximately the condition $t_{in}=0.25\lambda\pm\Delta t_{res,\alpha}$, the thickness $t_{out}$ from the bent portion to the tapered output end 111b satisfies approximately the condition $t_{out}=0.5\lambda\pm\Delta t_{res,\beta}$, and the thickness $t_{tp}$ of the tapered output end 111b satisfies approximately the condition $t_{tp}=0.25\lambda\pm\Delta t_{res,\gamma}$. Here, λ is a wavelength of the light, $\Delta t_{res,\alpha}$ is a thickness deviation related to front scattering and resonance, $\Delta t_{res,\beta}$ is a thickness deviation related to scattering at the 90°-bent portion and resonance, and $\Delta t_{res,\gamma}$ is a thickness deviation related to rear scattering and to resonance. For example, when the width and height of the aperture 1113 at the input end 111a are respectively 360 nm and 180 nm, the width and height of the aperture 113 at the output end 111b are respectively 270 nm and 180 nm, and the width and height of the ridge 114 are 90 nm, it can be estimated that thicknesses $T_{in}$, $T_{out}$, and $T_{tp}$ for obtaining a spot size of 100 nm at the output end with respect to an incident beam having a frequency of 384.6 THz may be respectively 250±10 nm, 420±10 nm, and 270±10 nm.

In the above description, although an example where the metallic waveguide 111 is bent at 90° is explained, the principle of the present invention can be identically applied to other cases where the metallic waveguide 111 is bent at an angle other than 90°. Therefore, the present invention is not limited to the case where the metallic waveguide 111 is bent at 90°. That is, the present invention can be applied to any case where the traveling direction of the light is changed in the waveguide without any loss.

The following will describe a method of fabricating the 90°-bent metallic waveguide according to an exemplary embodiment of the present invention with reference to FIGS. 20a through 20j.

Figure 20A:
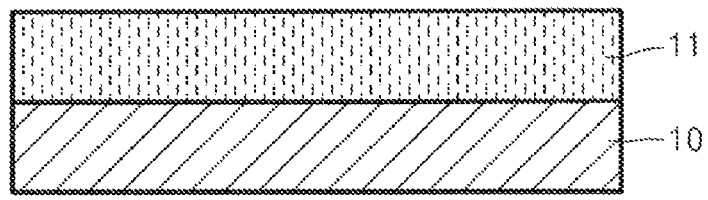
FIGS. 20A through 20J are views illustrating a method of fabricating a 90°-bent metallic waveguide having a tapered C-shaped aperture according to an exemplary embodiment of the present invention.
Figure 20B:
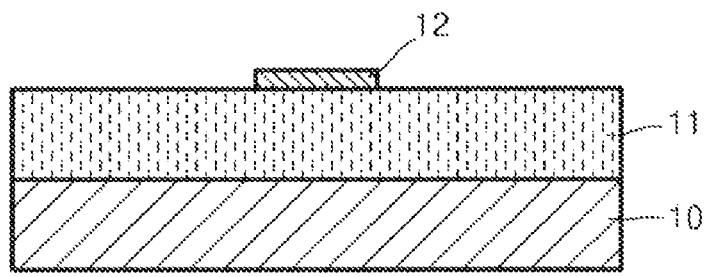
Figure 20C:
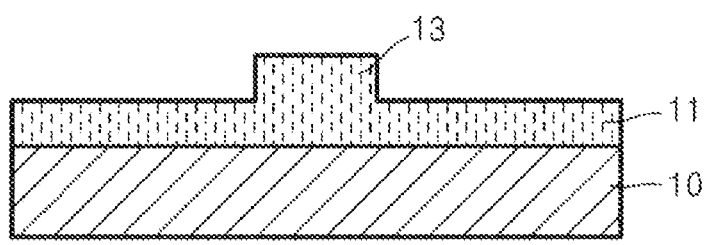
Figure 20D:
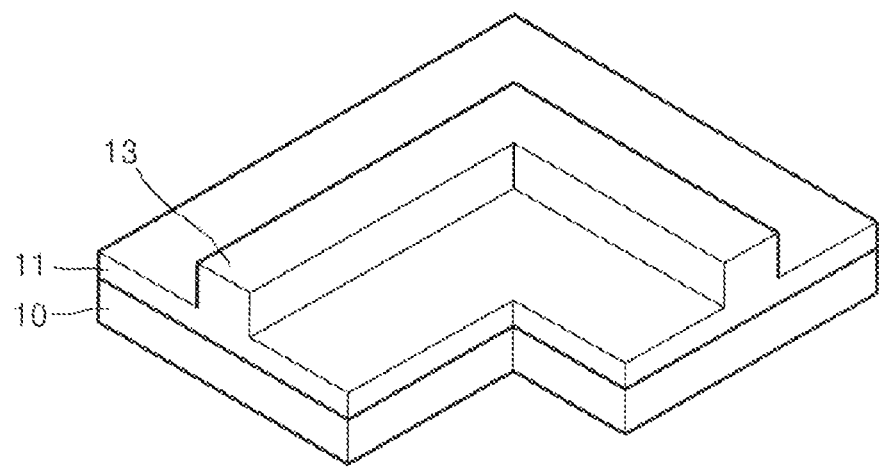

Referring first to FIG. 20a, a metal layer 11 is formed on an entire surface of a substrate 10 through, for example, a sputtering process. Next, as shown in FIG. 20b, a photoresist mask 12 is formed on the metal layer 11, and subsequently the metal layer 11 is partly etched through a reactive-ion etching (RIE) process. Then, the photoresist mask 12 is removed. Then, as shown in FIG. 20C, the ridge 13 is defined by a non-etched portion of the metal layer 11. FIG. 20D is a perspective view showing the ridge 13. As shown in FIG. 20D, the ridge 13 is bent at 90°. In order to form the 90°-bent ridge 13, the photoresist mask 12 formed on the metal layer 11 must be patterned to be bent at 90°.

Figure 20E:
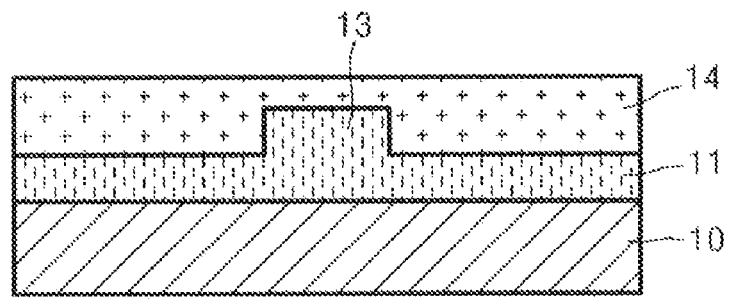
Figure 20F:
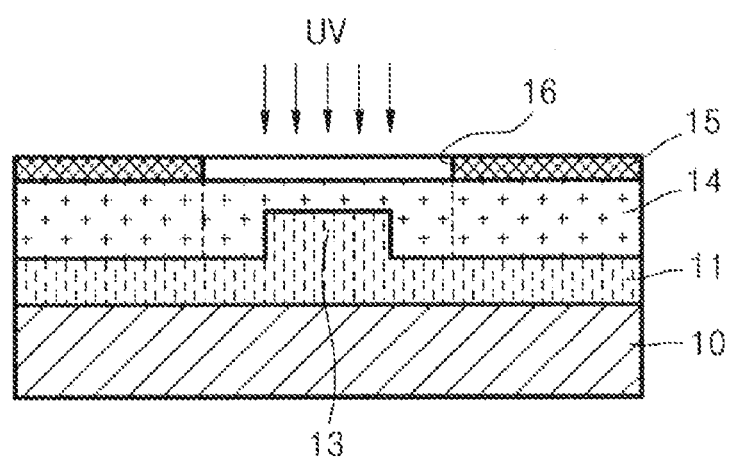
Figure 20G:
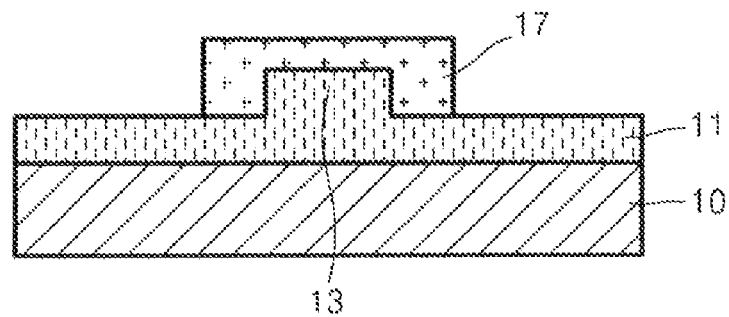
Figure 20H:
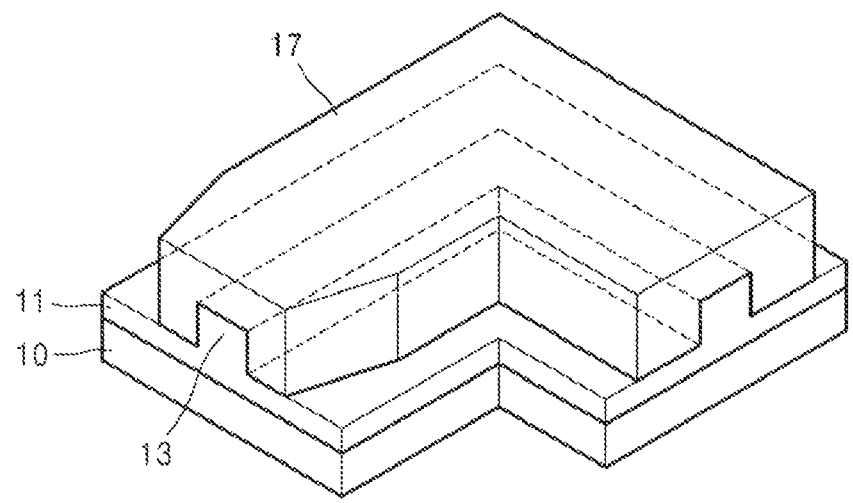

Next, as shown in FIG. 20E, an ultraviolet UV-curable resin layer 14 is formed on entire surfaces of the metal layer 11 and the ridge 13 with a predetermined height, for example, using a spin-coating method. Subsequently, as shown in FIG. 20F, a mask pattern 15 is transferred on the UV-curable resin layer 14 and UV lights are irradiated to the UV-curable resin layer 14 through a light transmission portion 16 of the mask pattern 15. Then, a portion of the UV-curable resin layer 14, which is irradiated by the ultraviolet lights, is hardened. Next, the non-hardened portion of the UV-curable resin layer 14 and the mask pattern 15 are removed. Then, as shown in FIG. 20G, a C-shaped aperture 17 surrounding the ridge 13 is formed on the metal layer 11. FIG. 20H is a perspective view showing the C-shaped aperture 17. As shown in FIG. 20H, the C-shaped aperture 17 is bent at 90° and has a tapered structure where a width is reduced at the output end side. To achieve this, in the process shown in FIG. 20F, the light transmission portion 16 of the mask pattern 15 must be patterned to correspond to the C-shaped aperture 17 shown in FIG. 20H.

Figure 20I:
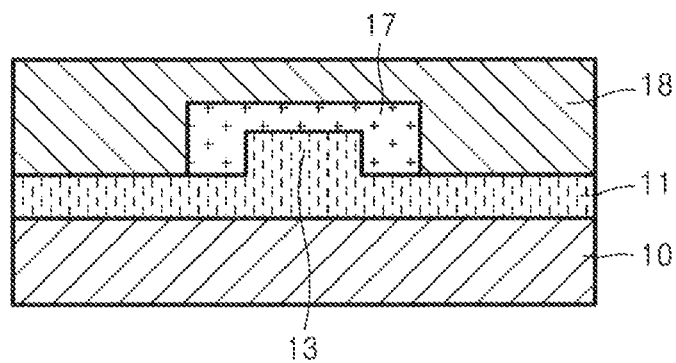
Figure 20J:
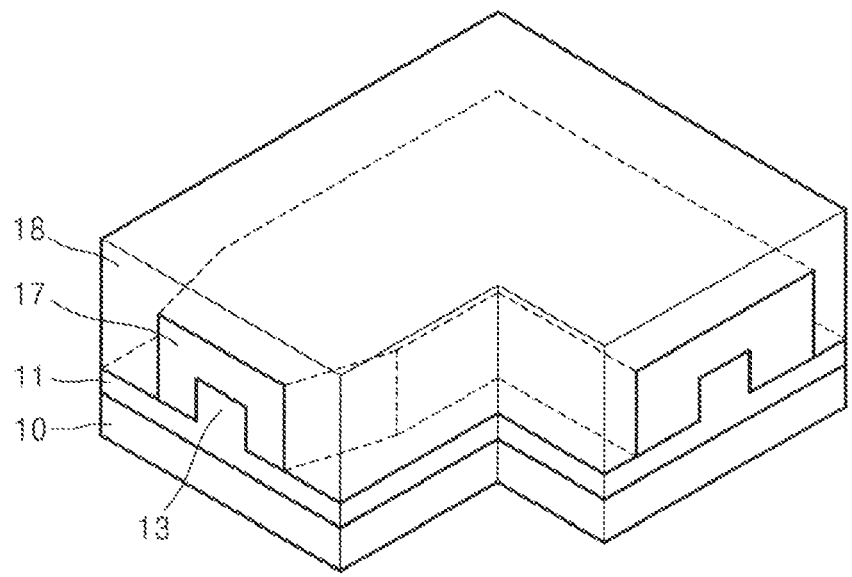

Finally, as shown in FIG. 20I, a metal layer 18 is formed on the C-shaped aperture 17 through, for example, a sputtering process. By doing this, the metallic waveguide having the 90°-bent C-shaped aperture according to an exemplary embodiment of the present invention can be fabricated. FIG. 20J is a perspective view showing the metallic waveguide having the 90°-bent C-shaped aperture.

As can be noted from the above-described fabrication method, the metallic waveguide having the 90°-bent C-shaped aperture according to an exemplary embodiment of the present invention can be fabricated through a planar process that is the same as a process for fabricating a related art magnetic head. Therefore, when the metallic waveguide of the exemplary embodiment of the present invention is employed in a HAMR head, the metallic waveguide can be fabricated together with the head through a batch process. Therefore, no separate fabrication and assembling processes for the metallic waveguide are required.

Figure 21:
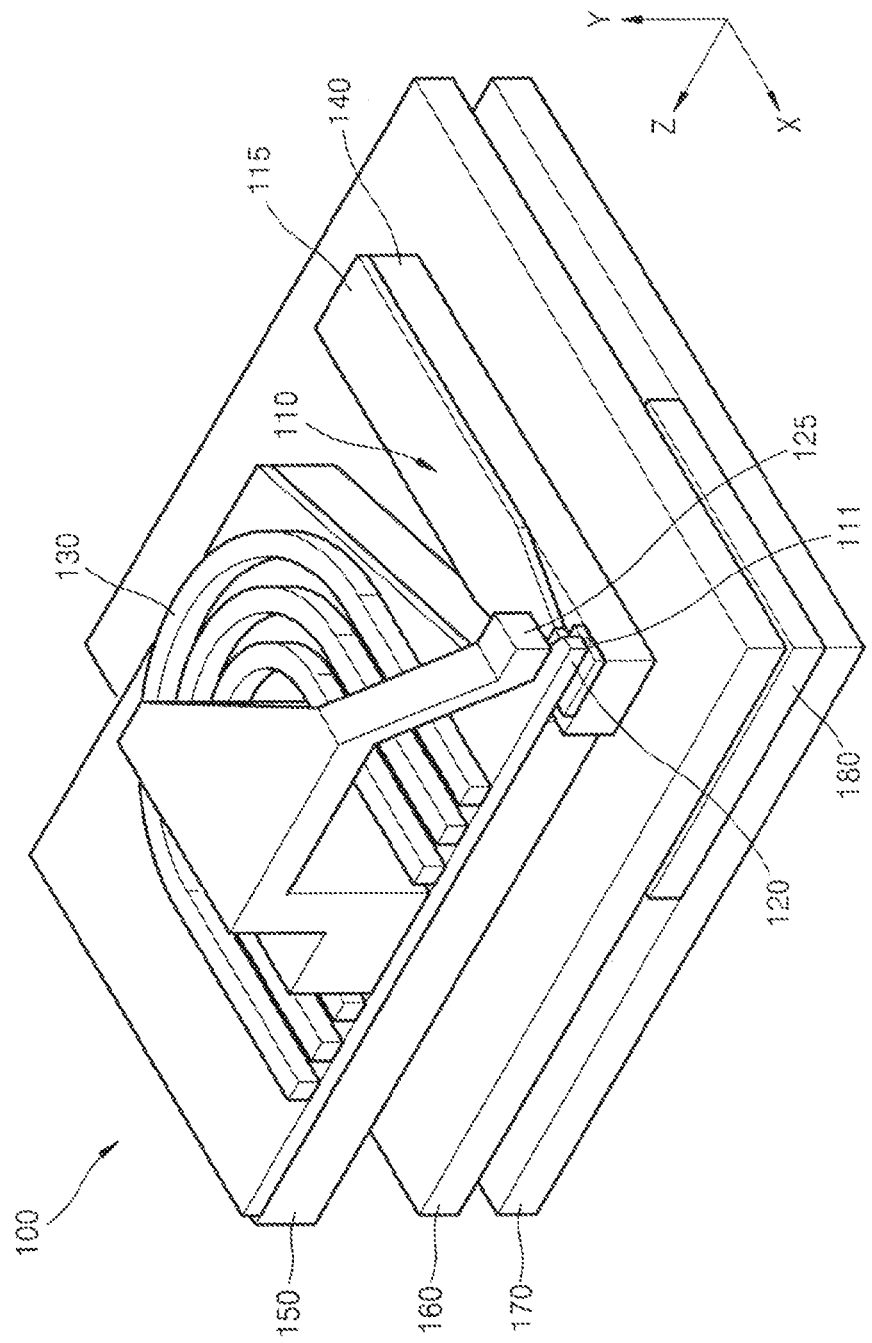
FIG. 21 is a perspective view of a heat assisted magnetic recording head according to an exemplary embodiment of the present invention.

FIG. 21 is a perspective view of a HAMR head employing the metallic waveguide having the 90°-bent C-shaped aperture the according to an exemplary embodiment of the present invention. Referring to FIG. 21, a HAMR head 100 of this exemplary embodiment includes a magnetic recording unit that forms an electric field for recording information in a magnetic recording medium (not shown) and a light delivery module 110 that emits light to heat a recording region of the magnetic recording medium. In addition, the HAMR head 100 may further include a reproduction element 180 for reading the recorded information and shield layers 160 and 170, which are disposed on opposite surfaces of the reproduction element 180 to prevent a stray field to be incident on the reproduction element 180.

The magnetic recording unit includes a main pole 120, a return pole 125, an inductive coil 130, and a sub-yoke 150. The main pole 120 functions to form a magnetic field magnetizing the magnetic recording medium. The return pole 125 is disposed to be spaced apart from a surface of the main pole 120, and magnetically connected to the main pole 120 to form a magnetic path. Further, the inductive coil 130 functions to induce the magnetic field to the main pole 120. Meanwhile, the sub-yoke 150 is disposed on the other surface of the main pole 120 to assist focusing of magnetic flux on an end of the main pole 120.

The light delivery module 110 functions to heat the recording region of the magnetic recording medium. As shown in FIG. 1, the light delivery module 110 includes a metallic waveguide 111 having a C-shaped aperture for emitting light to the magnetic recording medium, and a polymer waveguide 115 for delivering the light from an external light source 118 (see FIG. 1) to the metallic waveguide 111. Structures of the light deliver module 110 and the metallic waveguide 111 have been described in the forgoing description.

According to the present exemplary embodiment of the invention, the light delivery module 110 may be disposed close to the main pole 120 so that it can emit light just before information is recorded on the magnetic recording medium. As shown in FIG. 21, the main pole 120 is disposed on a top surface of the sub-yoke 150 such that an extreme end of the main pole 120 protrudes out of the sub-yoke 150. The light delivery module 110 may be disposed in a space defined between the main pole 120 and the shield layer 160 at a side surface of the sub-yoke 150. The space can be easily obtained in a structure of a related art magnetic recording head, and thus the HAMR head of the present invention can be fabricated without significantly changing a thin film fabrication process for the related art magnetic recording head. The metallic waveguide 111 and the polymer waveguide 115 of the light delivery module 110 may be formed at the same level as the sub-yoke 150. Therefore, in order to compensate for a thickness difference between the light delivery module 110 and the sub-yoke 150, the light delivery module 150 is mounted on the mount 140.

Although not shown in FIG. 21, as shown in FIG. 1, the input end of the polymer waveguide 115 of the light delivery module 110 is coupled to the optical fiber 117, and thus the light generated from the light source 118 is directed to the polymer waveguide 115 through the optical fiber 117. The light directed to the polymer waveguide 115 travels in an x-direction and is subsequently directed to the metallic waveguide 111. In the HAMR head 100 of the present exemplary embodiment, in order to allow the light delivery module 100 to heat the recording region, the light emitted from the light delivery module 100 must travel in a z-direction that is identical to the extreme end of the main pole 120. To this end, the metallic waveguide 111 has the 90°-bent C-shaped aperture 113. Therefore, the light directed to the metallic waveguide changes its direction by 90° to be emitted toward the magnetic recording medium. As described above, the metallic waveguide delivers the light without any loss and reduces the size of the output light spot using the tampered output end structure.

As described above, the light delivery module 110 can provide near field light having an enhanced small spot for the magnetic recording medium. Then, the magnetic recording medium is locally heated by the small-sized light spot emitted from the light delivery module 110, and thus a coercive force of the recording layer of the magnetic recording medium is weakened. As a result, the magnetic recording medium can be easily and magnetically recorded even when the intensity of the magnetic field generated from the main pole 120 is not high. Furthermore, since a material having a strong coercive force can be used for the magnetic recording medium, the recoding density can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, the locations and structures of the constituent elements of the HAMR head 100 may be changed.

Furthermore, in the above-described exemplary embodiments, a case where the metallic waveguide 111 having the 90°-bent C-shaped aperture and the light delivery module are employed to the HAMR head is exemplarily described. However, the present invention is not limited to this case. As an optical unit providing a small light spot and high light intensity, the metallic waveguide and light delivery module of the present invention may be used in a variety of application fields such as a single molecule detection field, a spectroscopy field, a nano-particle manipulation field, a single quantum dots field, a nanoparticle or nano-wire research field, and an ultra high density storage field.

For example, the microscopy, spectroscopy, and optical manipulation fields relating to a biochemical require a near field probe having high spatial resolution. At this point, even when an installing place of the near field probe is limited, the near field probe can be easily installed by employing the metallic waveguide and light delivery module of the present invention.

As another example, in an optical storage system, the metallic waveguide and light delivery module of the present invention may be also applied to a very small aperture laser (VSAL) device having a small aperture formed on a front end of a semiconductor laser. In this case, the recording density and reproduction speed of the optical storage system can be significantly improved.

As described above, the metallic waveguide having the 90°-bent C-shaped aperture according to the exemplary embodiment of the present invention has the following advantages.

1. Since the width of the input end is designed to be wide so that the profile matching with the tapered polymer waveguide can be possible, the coupling loss can be minimized.

2. By employing the 90°-bent structure, the metallic waveguide can be structured in a very small size and change the direction of the beam by 90° without using a separate optical element such as a mirror.

3. Since the C-shaped aperture is applied to the output end, light having a small spot size and a desired spot shape can be output through the output end.

4. The metallic waveguide of the present invention can maintain the field enhancement property of the C-shaped aperture while still having the above advantages.

5. Since the metallic waveguide of the present invention can be fabricated by a planar process at a lower temperature, it can be fabricated together with the current magnetic recording heat through a batch process.

What is claimed is:

1. A metallic waveguide comprising a metal body that is formed of conductive metal, and comprises an aperture whose input end and output end are formed through the metal body, wherein the aperture comprises:
   a bent portion that changes a light traveling direction between the input and output ends; and
   a tapered portion between the bent portion and the output end,
   wherein the tapered portion has a width that is gradually reduced toward the output end, and the aperture is formed in a C-shape by a ridge formed on an inner surface of the metal body.

2. The metallic waveguide of claim 1, wherein, when a thickness of the metallic waveguide is defined in a direction where the light travels, a thickness $t_{out}$ of the metallic waveguide from the bent portion of the aperture to the tapered portion of the aperture is greater than a thickness $t_{in}$ of the metallic waveguide from the input end to a before-bent portion.

3. The metallic waveguide of claim 2, wherein the thickness $t_{in}$ is determined such that a frequency of an incident beam coincides with a thickness resonance frequency through a thickness resonance analysis with respect to a portion of the metallic waveguide from the input end to the before-bent portion.

4. The metallic waveguide of claim 3, wherein the thickness $t_{in}$ satisfies an equation:

$$t_{in}=0.25\lambda \pm \Delta t_{res,\alpha}$$

where $\lambda$ is a wavelength of the light and $\Delta t_{res,\alpha}$ is a thickness deviation related to front scattering and resonance.

5. The metallic waveguide of claim 3, wherein a thickness $t_{tp}$ of the metallic waveguide at the tapered portion is determined such that the frequency of the incident beam coincides with the thickness resonance frequency through a thickness resonance analysis with respect to the tapered portion of the metallic waveguide.

6. The metallic waveguide of claim 5, wherein the thickness $t_{tp}$ satisfies an equation:

$$t_{tp}=0.25\lambda \pm \Delta t_{res,\gamma}$$

where, $\lambda$ is a wavelength of the light and $\Delta t_{res,\gamma}$ is a thickness deviation related to rear scattering and resonance.

7. The metallic waveguide of claim 5, wherein the thickness $t_{out}$ is determined such that the frequency of the incident beam coincides with the thickness resonance frequency through a thickness resonance analysis with respect to the overall metallic waveguide in a state where the thickness $t_{in}$ and the thickness $t_{tp}$ are fixed.

8. The metallic waveguide of claim 7, wherein the thickness $t_{out}$ satisfies an equation:

$$t_{out}=0.5\lambda \pm \Delta t_{res,\beta}$$

where, $\lambda$ is a wavelength of the light and $t_{res,\beta}$ is a thickness deviation related to scattering at the bent portion of the aperture and resonance.

9. The metallic waveguide of claim 1, wherein each of the metal body and the aperture formed through the metal body has a width and a height that is less than the width.

10. The metallic waveguide of claim 1, wherein the aperture is filled with air or a dielectric.

11. The metallic waveguide of claim 1, wherein a width and a height of the ridge are uniformly maintained.

12. A method of fabricating the metallic waveguide of claim 1, the method comprising:
forming a metal layer on a substrate;
forming the ridge in a bent shape by etching a portion of the metallic layer such that the ridge has a predetermined width and thickness;
depositing an ultraviolet (UV)-curable resin on the ridge and the rest of the metal layer;
forming the aperture bent surrounding the ridge and having a tapered structure whose width is gradually reduced at an end by partly hardening the UV-curable resin;
removing an unhardened portion of the UV-curable resin; and
forming another metal layer surrounding the aperture.

13. A light delivery module comprising:
a first metallic waveguide that is formed of a conductive metal body and provided with an aperture therein; and
a second waveguide that delivers light from a light source to the first metallic waveguide,
wherein the aperture comprises:
a bent portion that changes a light traveling direction between an input end and an output end; and
a tapered portion between the bent portion and the output end,
wherein the tapered portion has a width that is gradually reduced toward the output end, and the aperture is formed in a C-shape by a ridge formed on an inner surface of the first metallic waveguide.

14. The light delivery module of claim 13, wherein, when a thickness of the first metallic waveguide is defined in a direction where the light travels, a thickness $t_{out}$ of the first metallic waveguide from the bent portion of the aperture to the tapered portion of the aperture is greater than a thickness $t_{in}$ of the first metallic waveguide from the input end to a before-bent portion.

15. The light delivery module of claim 14, wherein the thickness $t_{in}$ is determined such that a frequency of an incident beam coincides with a thickness resonance frequency through a thickness resonance analysis with respect to a portion of the first metallic waveguide from the input end to the before-bent portion.

16. The light delivery module of claim 15, wherein a thickness $t_{tp}$ of the first metallic waveguide at the tapered portion is determined such that the frequency of the incident beam coincides with the thickness resonance frequency through a thickness resonance analysis with respect to the tapered portion of the first metallic waveguide.

17. The light delivery module of claim 16, wherein the thickness $t_{out}$ is determined such that the frequency of the incident beam coincides with the thickness resonance frequency through a thickness resonance analysis with respect to the overall first metallic waveguide in a state where the thickness $t_{in}$ and the thickness $t_{tp}$ are fixed.

18. The light delivery module of claim 13, wherein the second waveguide is formed in a flat shape where a width is greater than a height, and a width of an input end is greater than a width of an output end.

19. The light delivery module of claim 18, wherein each of the first metallic waveguide and the aperture has a width and a height that is less than the width to realize a profile matching with the second waveguide;

20. A heat assisted magnetic recording head comprising:
a magnetic recording unit which forms a magnetic field that records information on a magnetic recording medium;
a light delivery module which emits light to heat a recording region of the magnetic recording medium,
wherein the light delivery module comprises:
a first metallic waveguide that is formed of a conductive metal body and provided with an aperture therein; and
a second waveguide that delivers light from a light source to the first metallic waveguide,
wherein, the aperture comprises:
a bent portion that changes a light traveling direction between an input end and an output end; and
a tapered portion between the bent portion and the output end, and
wherein the tapered portion has a width that is gradually reduced toward the output end, and the aperture is formed in a C-shape by a ridge formed on an inner surface of first metallic waveguide.

21. The heat assisted magnetic recording head of claim 20, wherein, when a thickness of the first metallic waveguide is defined in a direction where the light travels, a thickness $t_{out}$ of the first metallic waveguide from the bent portion of the aperture to the tapered portion of the aperture is greater than a thickness $t_{in}$ of the first metallic waveguide from the input end to a before-bent portion.

22. The heat assisted magnetic recording head of claim 21, wherein the thickness $t_{in}$ is determined such that a frequency of an incident beam coincides with a thickness resonance frequency through a thickness resonance analysis with respect to a portion of the first metallic waveguide from the input end to the before-bent portion.

23. The heat assisted magnetic recording head of claim 22, wherein a thickness $t_{tp}$ of the first metallic waveguide at the tapered portion is determined such that the frequency of the incident beam coincides with the thickness resonance frequency through a thickness resonance analysis with respect to the tapered portion of the first metallic waveguide.

24. The heat assisted magnetic recording head of claim 23, wherein the thickness $t_{out}$ is determined such that the frequency of the incident beam coincides with the thickness resonance frequency through a thickness resonance analysis with respect to the overall first metallic waveguide in a state where the thickness $t_{in}$ and the thickness $t_{tp}$ are fixed.

25. The heat assisted magnetic recording head of claim 20, wherein the magnetic recording unit comprises:
a main pole forming a magnetic field magnetizing the magnetic recording medium;
a return pole disposed facing a surface of the main pole and magnetically connected to the main pole to form a magnetic path;
an inductive coil for inducing the magnetic field to the main pole;
a sub-yoke disposed on the other surface of the main pole to assist the focusing of magnetic flux on an extreme end of the main pole.

* * * * *